United States Patent
Smith

[19]

[11] Patent Number: 5,979,616
[45] Date of Patent: Nov. 9, 1999

[54] TILT CONTROL APPARATUS FOR VEHICLES

[75] Inventor: Stewart Gregory Smith, Yorklyn, Del.

[73] Assignee: Cloud Farm Associates, L.P., Yorklyn, Del.

[21] Appl. No.: 09/020,063

[22] Filed: Feb. 6, 1998

Related U.S. Application Data

[63] Continuation-in-part of application No. 08/603,164, Feb. 20, 1996, abandoned, which is a continuation-in-part of application No. 08/508,613, Jul. 28, 1995, Pat. No. 5,529,153, which is a continuation-in-part of application No. 08/195,903, Feb. 10, 1994, Pat. No. 5,437,354, which is a continuation of application No. 08/089,238, Jul. 12, 1993, abandoned.

[51] Int. Cl.$^6$ ........................................ F16F 9/46
[52] U.S. Cl. .................. 188/266.1; 701/41; 188/322.13
[58] Field of Search ............... 188/266.2, 266.1, 188/282.4, 282.3, 266.5, 322.13, 322.15, 322.22, 322.14; 280/DIG. 1, 124.103, 124.104, 124.106, 5.5, 5.502, 5.507, 5.508, 5.51, 5.512, 5.513, 5.515, 5.514, 5.506; 701/38, 37, 41, 45, 48

[56] References Cited

U.S. PATENT DOCUMENTS

| | | | |
|---|---|---|---|
| 4,564,214 | 1/1986 | Tokunaga et al. . | |
| 4,575,116 | 3/1986 | Miyata | 280/707 |
| 4,613,154 | 9/1986 | Tanaka et al. | 280/DIG. 1 |
| 4,616,163 | 10/1986 | Kanai et al. . | |
| 4,621,832 | 11/1986 | Nakashima et al. | 280/707 |
| 4,624,477 | 11/1986 | Kumagai et al. | 280/707 |
| 4,634,143 | 1/1987 | Asami et al. | 280/707 |
| 4,652,010 | 3/1987 | Sugasawa . | |
| 4,673,194 | 6/1987 | Sugasawa | 280/707 |
| 4,682,675 | 7/1987 | Eddy, Jr. | 280/707 |
| 4,697,237 | 9/1987 | Tanaka et al. | 701/38 |
| 4,765,649 | 8/1988 | Ikemoto et al. . | |
| 4,789,935 | 12/1988 | Buma et al. | 364/424.046 |
| 4,797,823 | 1/1989 | Ikemoto et al. | 280/DIG. 1 |
| 4,803,627 | 2/1989 | Yasuika et al. | 701/38 |
| 4,807,128 | 2/1989 | Ikemoto et al. | 280/DIG. 1 |
| 4,853,860 | 8/1989 | Achenbach | 364/424.046 |
| 4,922,427 | 5/1990 | Yokote et al. | 364/424.046 |
| 4,975,849 | 12/1990 | Ema | 364/424.046 |
| 5,056,812 | 10/1991 | Takehara et al. | 364/424.046 |
| 5,071,157 | 12/1991 | Majeed | 364/424.047 |
| 5,080,392 | 1/1992 | Bazergui | 280/707 |
| 5,102,162 | 4/1992 | Okuda et al. | 364/424.047 |
| 5,144,558 | 9/1992 | Fukushima et al. | 364/424.047 |
| 5,177,681 | 1/1993 | Sato | 364/424.047 |
| 5,360,089 | 11/1994 | Nakamura et al. | 280/707 |
| 5,437,354 | 8/1995 | Smith | 188/299 |
| 5,440,488 | 8/1995 | Yamaoka et al. | 280/707 |
| 5,442,554 | 8/1995 | Ohtagaki | 364/424.046 |
| 5,490,068 | 2/1996 | Shimizu et al. | 280/707 |
| 5,529,153 | 6/1996 | Smith | 188/299 |
| 5,555,173 | 9/1996 | Campbell et al. | 364/424.046 |
| 5,559,701 | 9/1996 | Shimizu et al. . | |

Primary Examiner—Douglas C. Butler
Attorney, Agent, or Firm—Herbert M. Wolfson

[57] ABSTRACT

A device for sensing the angular or turning movement of a moving vehicle is disclosed. At a pre-set point in the turn, the sensing device will provide a signal to the suspension system to change from "soft" to "stiff" suspension and thus prevent any further tilting of the vehicle.

5 Claims, 11 Drawing Sheets

TILT CONTROL APPARATUS FOR VEHICLES

CROSS-REFERENCE TO RELATED APPLICATIONS

This application is a continuation-in-part of U.S. patent application Ser. No. 08/603,164, filed Feb. 20, 1996, now abandoned which was a continuation-in-part of U.S. patent application Ser. No. 08/508,613, filed Jul. 28, 1995, and issued as U.S. Pat. No. 5,529,153, which was a continuation-in-part of U.S. patent application Ser. No. 08/195,903, filed Feb. 10, 1994, and issued as U.S. Pat. No. 5,437,354, which was a continuation of U.S. application Ser. No. 08/089,238, filed Jul. 12, 1993, now abandoned.

FIELD OF THE INVENTION

The present invention relates to a suspension control system for automotive and railroad vehicles and the like. More particularly, the invention relates to a technology for suppressing vehicular rolling motion, i.e., the tendency of the vehicle to tilt when the vehicle turns a corner or is driven around a sharp curve, without destroying the comfortable, so-called "soft ride" provided by the conventional spring and shock absorber systems that compensate for the rapid upward and downward movements encountered when the vehicle travels over rough roads; and most particularly, to a novel sensing system to signal the suspension control system to convert from a soft ride to a less soft or "hard ride", and, thus, avoid excessive tilting.

DESCRIPTION OF THE BACKGROUND ART

As shown in the prior art, the conventional spring and shock absorber system is used in automobiles to reduce shock or concussion when the vehicle strikes a bump or, in general, when the wheel movement of the vehicle over a roughness in the surface of the road moves the auto's axle toward the frame or body of the vehicle. The shock absorber is mounted between the automobile frame and the axles. It usually consists of a piston and dampening means inside a cylinder partially filled with fluid. When the wheel hits the bump, instead of the axle communicating the shock directly to automobile frame, the piston is pushed upwardly or downwardly. The fluid in the specially-designed cylinder, with or without additional shock dampening means, resists and decelerates the movement of the piston thus offsetting the force of the bump. The hydraulic fluid, rather than the frame, absorbs most of the shock. The ease with which the piston can compress the fluid determines the so-called "hardness" of the ride.

When a vehicle moves around a curve in the road, the suspension permits the vehicle body to rotate slightly about its longitudinal axis in response to the rolling force exerted on the body during the turn. Typically, vehicle passengers experience this effect as a tilt of the vehicle body, with the side of the body on the outside of the curve being relatively lower than the side of the body on the inside. Further, the vehicle body tends to pitch forward so that the front of the body is relatively lower than the rear. The pitch and roll combine to incline the vehicle body toward the front corner on the outside of the turn.

The prior art is replete with anti-roll systems that may be added to the conventional shock absorber systems. In general, these systems are complex requiring several additional pieces of equipment in a space that is already crowded. These systems counteract vehicle roll by providing lifting forces acting between the vehicle body and the axle or suspension on the outside of the curve or by providing a vehicle lowering force acting between the body and axle or suspension on the inside turn side of the vehicle. Some anti-roll systems in the prior art provide complementary lifting and lowering forces on both sides of the vehicle simultaneously with the accompanying array of equipment. A typical tilt or sway control apparatus is shown in U.S. Pat. No. 2,934,353 issued in 1960 to L. B. d'Avigdor. In this apparatus, the inventor provides at each side of the vehicle, between the axle and the body, a body raising and lowering motor device including an expandable pneumatic chamber and means for supplying air to and discharging it from the chamber to regulate the volume of the chamber. This air supply and exhaust means is controlled by electrically operated valves in response to an electrically operated switch mechanism. The switch mechanism responds to centrifugal force and to gravity, and is thus affected by both tilting and lateral acceleration of the vehicle.

It is an object of the present invention to provide an improved tilt control apparatus, improved over the prior art in both effectiveness and in simplicity.

It is a further object to provide a novel sensing system to activate the tilt control apparatus but will not interfere with the vehicle's conventional shock absorber system.

It is still further object to provide such sensing means for tilt control by mere modification of the vehicle's conventional shock absorber system.

Because of the large force generated by the tilt of the heavy vehicle, a strong support structure is necessary at the frame and at the axle for tilt control. Since the conventional shock absorbers in existing vehicles are usually placed in the strongest area, it is also an object of this invention to incorporate the sensing means and the tilt-controller into the vehicle and the shock absorber systems currently in use, which will permit easy and economical insertion into existing vehicles.

It is another object to provide operable tilt control for a suspension system that requires air or fluid injection (as in U.S. Pat. No. 2,934,343) or uses a mechanical response to stiffen the suspension. In a rapidly moving vehicle, such systems usually require about 0.3 second to react. Hence, it is an object of this invention to provide sensing means that will anticipate the need for tilt control.

In summary, the object of the present invention is to improve the vehicle's handling under adverse conditions in terms of high speed evasive maneuvers by providing responsive steering (the so-called "stiffride" position) as well as in normal turning where the stiff ride position reduces the roll or tilt of the vehicle but does not change from "soft" to "stiff" ride to make the occupant suffer through each bump in the road while the vehicle is moving on a straightaway as he would if the stiff position were engaged full time.

SUMMARY OF THE INVENTION

The present invention provides a relatively simple, but effective sensing unit-tilt controller or absorber combination in a moving vehicle that permits the shock absorber system to insulate the body (and the passenger therein) against the sharp upward and downward movement due to road roughness on the straightaway, while also controlling the tilt or sway of the body of the vehicle when a sensing unit "senses" movement of the wheels to the left or to the right by either (a) sensing the cause of the movement (steering wheel rotation), (b) the effect of the movement (the turning of the vehicle), both of which anticipate the onset of tilt, or (c) the angular movement of the car body itself by the movement of a ball bearing or rotatable object within a tubular run or track placed across the width of the vehicle and parallel to its axle.

Thus, in one typical shock absorber system for a movable vehicle having at least two structural elements, the body and a transverse axle, and which depends upon a slidable piston mounted at one end of and within a chamber having two separated portions of fluid partially filling the chamber, and wherein the piston comprises one end of the chamber and is attached to one of the structural elements, i.e., to the body or to a transverse axle of the vehicle, and the other end of the chamber is closed and attached to the other of the structural elements of the vehicle, this invention involves the incorporation of a rotation- or angular movement-sensing means to sense the angular movement of the vehicle; means for converting a soft ride of the vehicle to a stiff ride, e.g., sealing means within the chamber separating the two portions of fluid; means to communicate the pre-set maximum angle sensed by the sensing means to the sealing means to reduce or prevent any further flow of fluid from one portion to the other portion of the fluid within chamber, and, thus, prevent or decelerate further movement of the piston within the chamber and consequent tilting of one of the structural elements of the vehicle toward the other structural element to decrease the distance between the two structural elements, i.e., convert the "soft" ride of the vehicle to a "stiff" ride.

Specifically, in a vehicle having a transverse axle and a body, below which the axle is attached, the tilt controller or shock absorber-tilt controller is mounted between the axle and the body on one or both sides of the vehicle and comprises (1) means for sensing the angle to which the vehicle's wheels are turned to the left or right, in combination with (2) means mounted between the axle and the body for shock dampening and for controlling the tilt of the vehicle so that as the angle of said turn increases to a predetermined value, e.g., from 5 to 20 degrees, for speeds up to about 70 miles per hour, the sensing means is activated to send a signal to the tilt controlling means that may be within the shock absorber means so that further tilt of the vehicle is prevented. This signal of the angle may be combined with a signal from an indicator of the speed of the vehicle to provide the ultimate signal to activate the tilt controlling means. For a low center of gravity vehicle, the activation would occur when the speed reached 20 miles per hour and the rotation signal indicated an angle of 20 degrees. For vehicles with a higher center of gravity, activation might occur for a speed of 20 miles per hour at a lower angle of turn, e.g., 9–10 degrees.

Alternatively, a relationship between speed and angle could be developed for programming a computer so that at 40 miles per hour, the activating signal would occur at about a 5 degree angle for the higher center of gravity vehicle, 7–8 degrees for the lower; at 30 miles per hour, at about a 10 degree angle, etc. The approximate speed/turn angle relationship for activating the means for controlling the suspension system to convert the fast rate of movement of body toward axle to a relatively slow rate i.e., to convert the normally soft suspension to a relatively stiff suspension is given in the following table.

TABLE

| Vehicle Speed (miles/hour) | Turning Angle to Activate Suspension System Control (degrees) |
|---|---|
| 120 | 1 |
| 100 | 2 |
| 80 | 3 |
| 60 | 6 |
| 40 | 7–8 |
| 20 | 9–10 |
| 10 | 13–15 |

Basically, the shock absorber means depends upon a movable piston within a chamber containing a hydraulic fluid, the chamber mounted between the body and the axle of the vehicle. The piston is attached to either the body or the axle; and the fluid acts as a cushion as the piston and the body or axle, to which the piston is attached, are moved toward the corresponding axle or body, the amount of movement (when the vehicle is traveling substantially straight, i.e., at a zero angle from normal) depending only upon the severity of the bump. As the angle increases with turning of the wheels, the closer the body moves toward the axle and the greater the tilt that the vehicle experiences. The tilt controller takes over at a pre-set maximum angle to prevent or reduce any further movement of the body toward the axle by preventing or reducing further fluid flow within the chamber, and thus preventing or reducing any further movement of the piston (and the attached body or axle) toward the corresponding axle or body.

Several sensing mechanisms may be used to sense the maximum angle, which would then activate the shock absorbers on the outside of the turn to switch to the stiff ride position. Mechanical devices such as the mercury switches with the tube between them as described in U.S. Pat. No. 5,437,354 would be one option.

A second embodiment would use sensors on the steering column itself. These would not sense tilt but would anticipate tilt by sensing the initiation of a turn (that might result in tilt). By activating the shocks on the outside of the car to switch to a "stiff ride" at the initiation of a turn, the tilt of the vehicle around the turn would be reduced. Specifically, two copper protrusions located horizontally on the steering column would touch (and therefore connect electrically) with two copper protrusions located on the inside of the housing of the steering column. The protrusions on the inside of the steering column would be at 20 degrees and 160 degrees respectively (for sensing a 20 degree turn since the sensors on the steering column are at 0 and 180 degrees). As the steering wheel is turned to the right the sensor on the column at 180 degrees rotates upward and touches the sensor on the housing located at 160 degrees. This then sends a message to the shock absorbers on the left front and left rear axle or to all shock absorbers to switch to stiff suspension from the usual soft suspension.

A third embodiment involves a sensor located on the front wheel and axle. Viewed from the top with the vehicle going straight forward, the wheel would be 90 degrees to the axle. Sensors would be placed at the front and back of the axle (180 degrees apart, as viewed from above). When a right turn is initiated (now viewed in terms of the right wheel) the wheel would turn away from the aforementioned front sensor (a spring loaded device that can travel inward but not outward). This would break its contact with the wheel causing a message to be sent to the left front and left rear shock absorber to switch to the stiff mode. The sensor on the back side of the axle would be compressed by the wheel turning inward and would not send any messages. Obviously, a similar message could also be sent from the rear unit. Another option would be to have the back units only in operation to send a message only upon compression. In this way, only one unit would be activated when compressed.

As stated hereinbefore, more sophisticated detection systems run by computer could also be used both in sensing rotation of the steering column or movement of right or left wheels of the vehicle. After sensing, the messages or signals would be sent to a microprocessing computer which would control activation of the tilt absorber(s) based upon other inputs, e.g., speed of the vehicle, parking maneuvers, etc. along with the aforementioned angle of turning of the wheels or rotation of the steering column.

Although the sensing mechanisms shown in U.S. Pat. No. 5,437,354, particularly the mechanism shown in FIGS. 1 and 3–8 of that patent, would also be useful for use in the present invention, the preferred mechanisms are those shown in FIGS. 1 and 1A and 5–8 of this disclosure, particularly the steering wheel-position sensing in FIGS. 1 and 1A and the front wheel-position sensing in FIGS. 5–7. These are shown using a "generic" non-contact interrupter sensor. A blade is mounted on the movable member and the sensors are mounted on a stationary surface. On the steering wheel version, they can be optical, hall-effect, magnetic reed, inductive, or capacitive sensors. The optical and capacitive sensors would work but not very well in the dirty environment of the front wheel, but the other types of sensors could be used successfully in all environments.

These sensors will activate anytime the wheel is turned a sufficient pre-set amount. In their simplest implementation, the sensors would energize the tilt absorbers when the vehicle is not moving and even on very slow turns. For example, one may not want them activating during parking maneuvers, etc. To avoid such activation, sensors signals could be inputted into the vehicle's microprocessor, which could control the activation of the tilt absorbers based on the speed of the vehicle and other factors fed to the microprocessor to limit unnecessary activation of the tilt absorbers.

The preferred tilt absorber or controller, which actually limits the tilting movement of the vehicle is claimed in U.S. Pat. No. 5,437,354 and comprises, on at least one side of the vehicle, hydraulic means consisting essentially of a chamber partially filled with fluid; a movable piston sealing the lower end of the chamber, integral with or attached to the transverse axle; the upper end of the chamber being closed and attached to or integral with the frame or body of the vehicle; a plate within the chamber having an opening (preferably substantially central) and so placed as to separate the fluid within the chamber into a lower portion and an upper portion; a movable sealing means or valve within the chamber adapted, when activated, to seal the central opening either completely to change from a "soft ride" to a "hard ride" or partially to change from a "soft ride" to a "less soft ride"; means for moving the sealing means or valve into the closed or partially closed position; means for sensing the angular movement of the steering wheel, front wheels, etc. of said vehicle, (as previously described) electrically connected to the means for moving the sealing means whereby the sealing means is moved into the closed or partially closed position when the sensing means is activated at a predetermined angular position of the wheels of the vehicle to reduce or prevent flow of the fluid from one portion of the chamber through the opening and into the other portion of the chamber and, thus, reduce tilting of the frame or body of the vehicle and provide a "harder" or "stiffer" ride.

Furthermore, in shock or suspension systems which are capable of switching from "stiff" ride to "soft" ride by mechanical, electrical, pneumatic, or fluidic means, the use of the sensing means which anticipates tilt would significantly improve their ability to control tilt. In anticipating tilt and reacting permits these systems to function successfully even with the delays inherent in their operation.

This apparatus preferably includes electromagnetic means and a spring assembly for operating the valve. An electrical switch controlled by the tilt of the sensing means and the movement of the electrically conductive material within the sensing means serves to energize the electromagnetic valve-operating means.

Thus, to modify a vehicle having a conventional shock absorber mounted between axle and body, the apparatus for both absorbing shock and for limiting the tilting movement of the vehicle and converting to a "harder ride" comprises in one embodiment, a chamber partially filled with hydraulic fluid and having an upper end and a lower end, the lower end of the chamber being closed and attached to a transverse axle of the vehicle; a tubular structure, e.g., cylindrical, rectangular, hexagonal, etc. within and substantially concentric with, and attached to the chamber in such a manner that the fluid within the chamber can flow into the area separating the inner wall of the chamber and the outer wall of the concentric tubular structure; a movable piston slidably connected within the tubular structure and sealing the upper end of the chamber, and attached to the body; a lockplate assembly within the tubular structure having an opening, preferably substantially central, separating the fluid within the structure into a lower portion and an upper portion; optionally, dampening means between the face of the piston and the lower end of the chamber adapted to resist partially the downward movement of the piston, e.g., a series of plates having openings and pop-up valves or a spring, the plates being spring mounted between the piston and the lockplate assembly; movable sealing means within the structure and, when activated, adapted to seal or partially seal the opening or openings through which fluid flows; means for moving the sealing means to seal the opening; means for sensing the angular movement of the vehicle, electrically combined with means for moving the sealing means to seal the opening(s) when the sensing means is activated at a predetermined angular position of the wheels of the vehicle to reduce or prevent flow of fluid from the upper portion of the tubular structure into the lower portion and into the area between the outer wall of the chamber and the concentric tube mounted within the chamber and, thus, prevent further movement of the piston and further tilting of the frame or body of the vehicle.

An alternative embodiment involves a movable piston sealing the lower end, instead of the upper end, of the partially filled chamber and attached to the transverse axle; the upper end of the chamber being attached to the body of the vehicle. Until a sealing means is activated, as described in the previous paragraph, by the sensing means being activated at a predetermined angular position of the steering wheel or front wheels, etc. to prevent the piston from pushing fluid upwardly within the chamber, the assembly operates as a conventional shock absorber to dampen the upward and downward movement of the vehicle as it travels over the bumpy highway. When flow is prevented, no further movement of body toward axle can occur and tilt of the vehicle is controlled An electromagnetic means and a spring assembly are usually combined to operate the sealing means.

An electrical switch controlled by the means for sensing maximum tilt and the movement of the electrically conductive material within the sensing means serves to energize the electromagnetic means.

A third embodiment of the shock absorber-tilt controller or tilt absorber, not unlike the first embodiment described hereinbefore, also involves a movable piston attached to the body of the vehicle. The piston is slidably mounted within the concentric tubular structure within the partially fluid-filled chamber, and adapted for downward movement. The closed lower end of the chamber is attached to the transverse axle of the vehicle. The downward movement of the piston forces fluid through a substantially central opening in a lockplate assembly that is fixably attached to the inner wall of the concentric tubular structure to cushion the shock caused by movement of the axle toward the body as the vehicle travels over bumpy roads. In the first embodiment, additional dampening of shock is obtained by placing a spring or other means to partially restrain downward movement of the piston. In this embodiment, dampening is obtained by placing a relatively weak spring below a valve adapted to cover the central opening of the lockplate. The valve contains holes near its center point to permit further flow at a reduced rate to further cushion the shock. However, an additional plate, combined with a relatively small diameter but stronger spring, mounted below the valve and concentric the axis of the valve acts as a sealing assembly when activated by the tilt-sensing means. Hence, when a predetermined maximum angular position is sensed, the strong spring is activated by electrical means to push the plate over the holes in the valve reducing or blocking further flow of fluid through the holes. Further downward movement of the piston is resisted or prevented, as well as any further movement of body toward axle or axle toward body.

BRIEF DESCRIPTION OF THE DRAWINGS

FIG. 3A, when the body of the vehicle is level; FIG. 3B, when it tilts to the left; and FIG. 3C, when it tilts to the right;

FIG. 4A shows the position of the switch at the left when the vehicle is level;

FIG. 4B, the position when the vehicle turns or lens to the left; and FIG. 4C, when the vehicle tilts to the right;

DETAILED DESCRIPTION OF THE DRAWINGS

Figure 3:
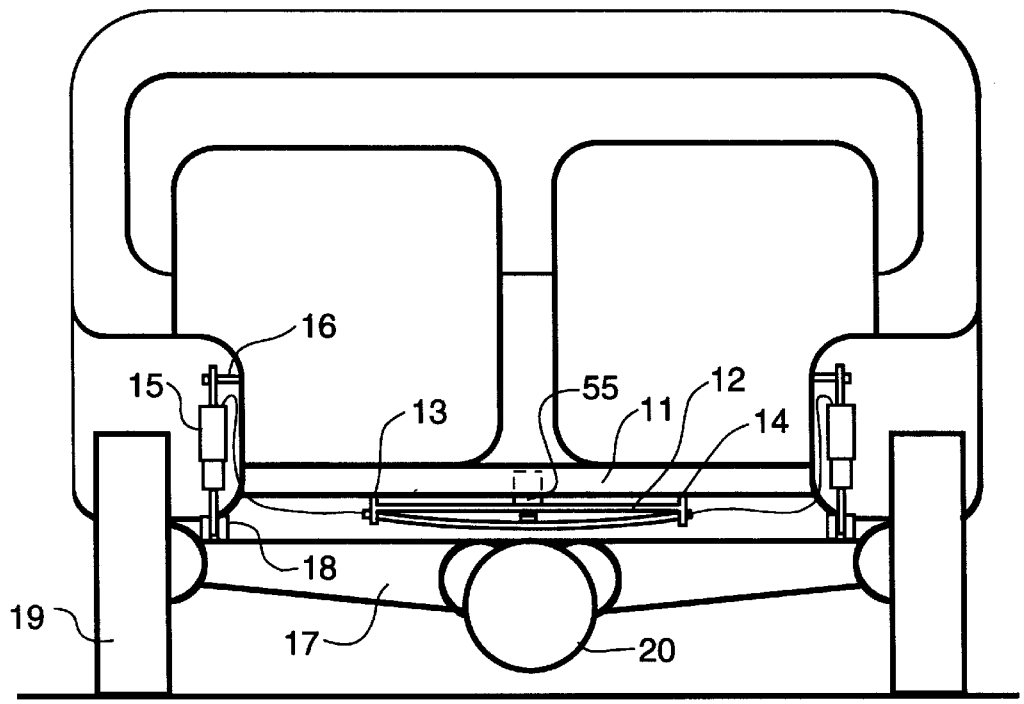
FIG. 3 is a cross-sectional view showing a vehicle equipped with a sensing unit for the tilt controller.

In FIG. 3, a schematic cross-section of the vehicle through one axle, one of the sensing unit 12 embodiments of the invention is shown attached to the body or frame of the vehicle 11 at positions 13 and 14. The shock absorber-tilt controller 15 is connected to the body 11 at position 16 and to the axle 17 at position 18. Connection may be accomplished by welding or by mechanical connectors, e.g., screws, bolts, etc. The wheels 19 are shown mounted on either end of axle 17 and connected to the vehicle's body 11 through conventional suspensions means, not shown. The differential for axle 17 is shown at 20.

Figure 2:
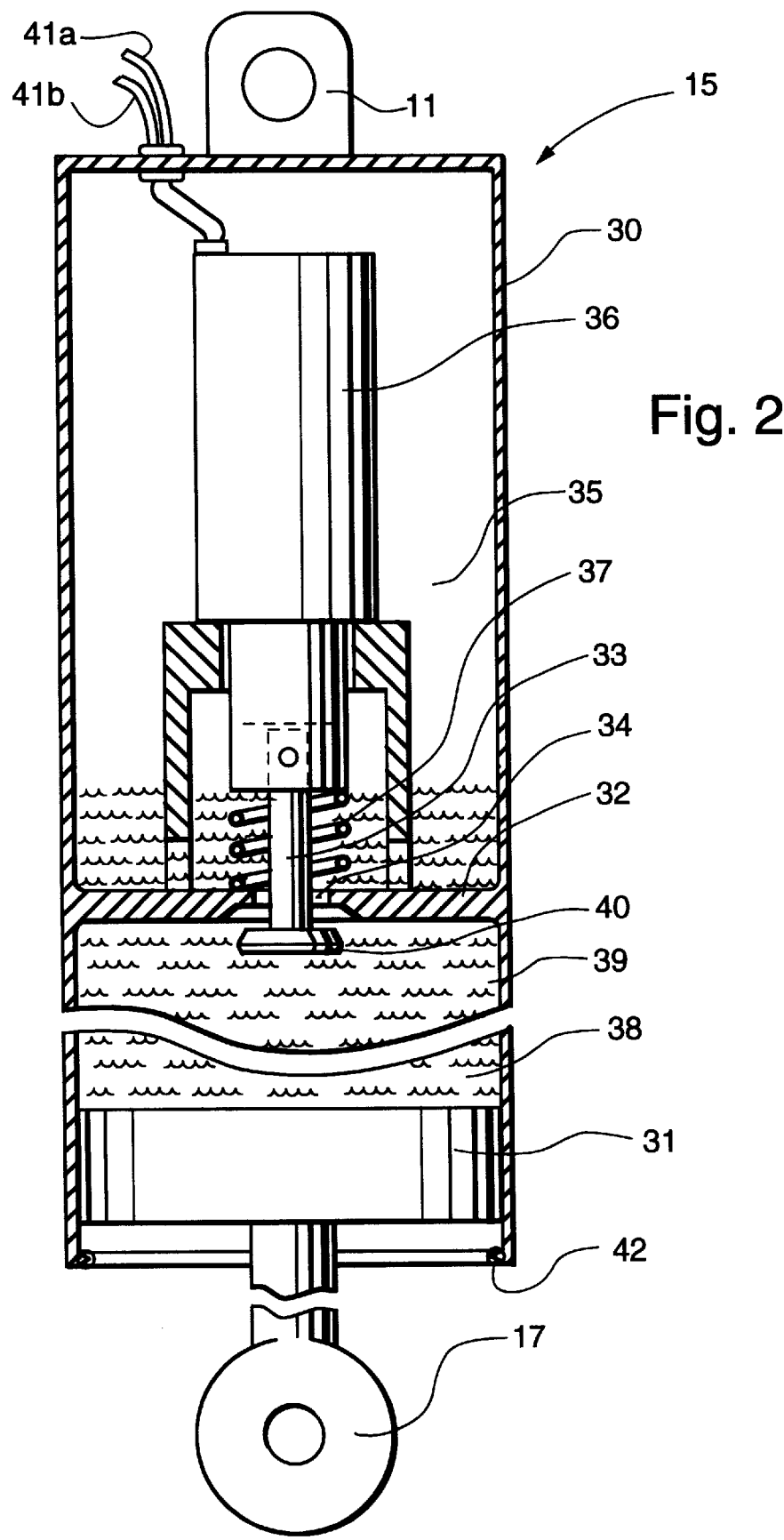
FIG. 2 is a vertical-sectional detail of an embodiment of a tilt controller unit.

The tilt stabilizer 15, one for each side of the vehicle, is shown in cross-sectional detail in FIG. 2. The stabilizer 15 is housed in casing 30. It is composed of a piston 31 within the casing, attached to the axle 17 below. Hydraulic fluid 38 is located within a chamber above the piston 31. When the vehicle hits a bump in the road, the fluid is forced past the lockplate 32 through opening 34. A seal 40, attached to a separate piston 33, does not close opening 34 since solenoid 36 is not activated when only a bump is encountered and there is no tilting of the vehicle. The hydraulic fluid 38 passes through the opening 34 into a reservoir chamber 35. Within the reservoir chamber, the solenoid device 36 is attached to the lockplate 32. The solenoid has a spring assembly 37 anchored to the back of the lockplate 32 and the solenoid's electrical wiring 41a and 41b communicates with the mercury switch of the sensing unit. The strength to cause blockage of fluid flow insures to the lockplate 32. Since the seal 40 is opened and the opening is quite large there is no resistance to compression or fluid flow when encountering a bump.

However, when tilting or unusual lateral acceleration depending upon speed and the angle of turning is encountered, the sensing unit will activate the solenoid 36 and cause the seal 40 to close the opening 34 in the lockplate 32. No fluid then can flow from the lower chamber 39 into the reservoir chamber 35. This prevents any further downward movement or tilting of the body of the vehicle.

As stated previously, the body of the vehicle 11 is moved up and down by the jarring action of the axle 17. The action, after being transmitted through the conventional shock absorber system, not shown, is not sharp enough to upset the passengers within the vehicle nor sufficiently angular to activate the sensing unit of the tilt controller.

However, as axle 17 is tilted more and more by the tilt in the road or by the lateral acceleration of the vehicle around a curve in the road, the axle 17 forces the piston 31 deeper and deeper into the primary cylinder or lower chamber 39 with more and more fluid 38 flowing through the opening 34 into overflow reservoir 35. The tilt of the body 11 approaches closer and closer to the tilt of the axle 17; and ultimately may shift the center of gravity of the vehicle, particularly for heavy trucks or vehicles carrying heavy loads, into an unstable position if not for the tilt controller 15.

Figure 3A:
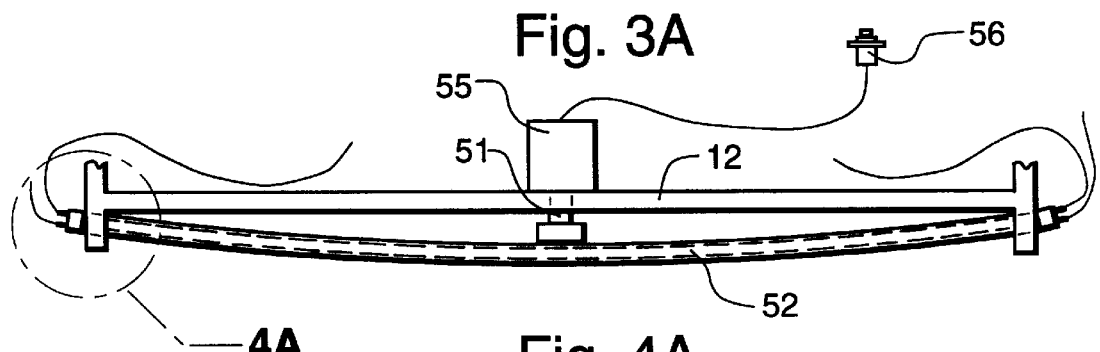
FIGS. 3A, 3B and 3C are elevational views of the sensing device shown in FIG. 3 utilizing a curved cylindrical tube containing the mercury switch in three positions.
Figure 3B:
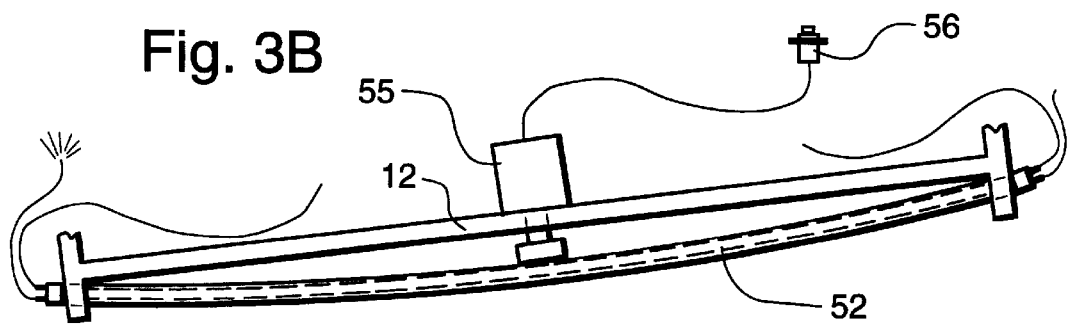
Figure 3C:
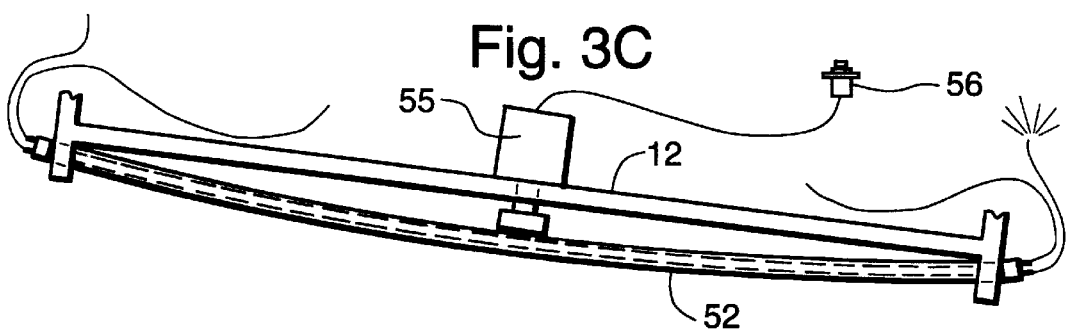

The tilt controller, shown at 15, electrically combined with the sensing device shown in FIGS. 3A, 3B and 3C, prevents the shift of the center of gravity from becoming uncomfortable or, possibly, fatal. Basically, the solenoid 36, activated by the electrical circuit which in turn was activated by the mercury switch, as shown in FIG. 4B, serves to seal the opening 34 at a preset angle of turning corresponding to a predetermined point in the tilting of the vehicle. This closure prevents any further flow of fluid 38 into reservoir 35; and also prevents any further tilt of the vehicle body. Basically, the piston 31, which is now unable to move upwardly, restrains any further tilt of the body of the vehicle almost instantaneously.

The solenoid device 36 is composed of a rod or piston 33 that fits within the solenoid 36. It is usually spring loaded and attached to the lockplate 32 as shown in FIG. 2. The solenoid 36 is connected to the vehicle's electrical circuit through wires or other electrical connectors 41A and 41B one to the vehicle's battery and the other to the sensing device 12, shown in greater detail in FIGS. 3A, 3B and 3C.

Figure 2A:
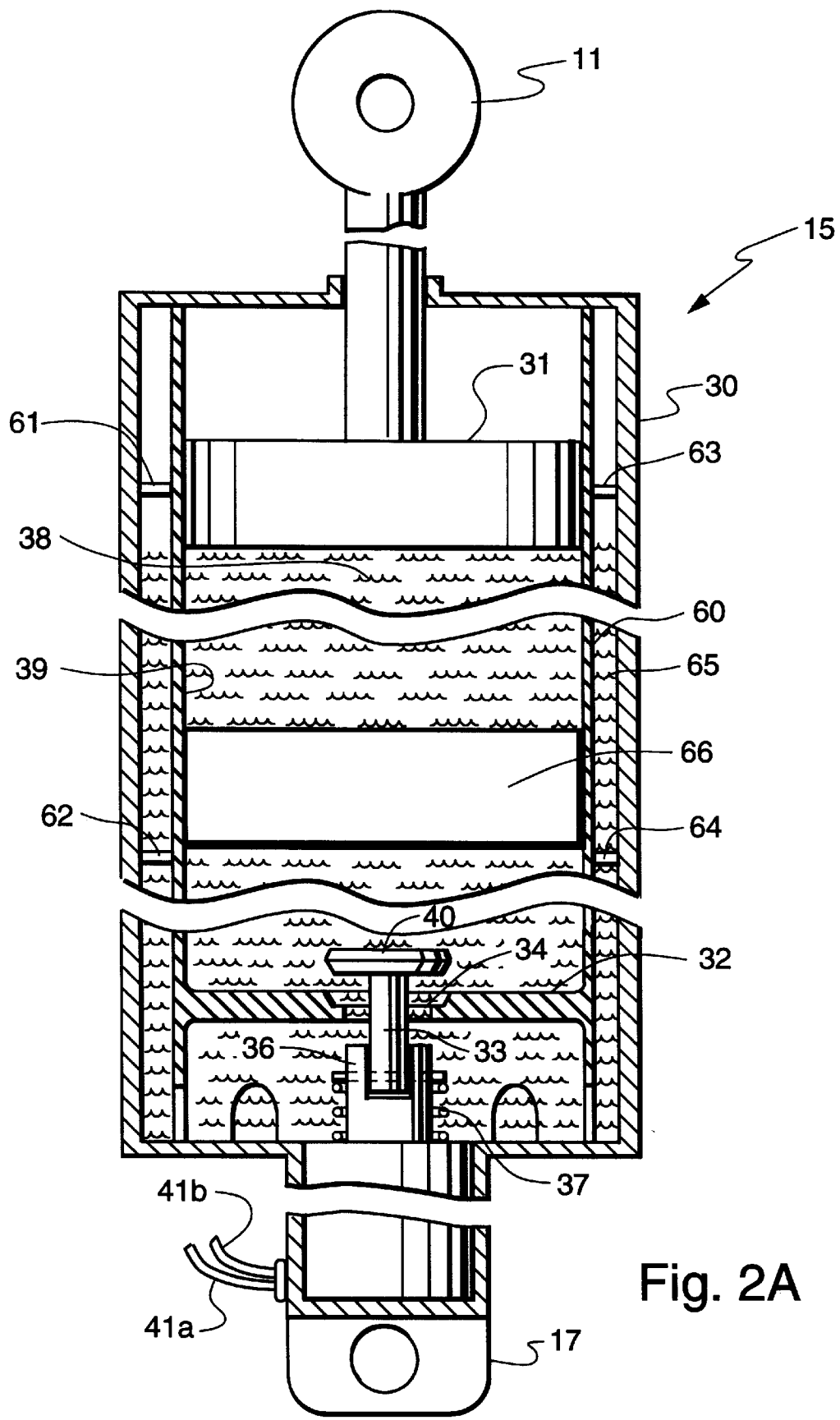
FIG. 2A is a vertical sectional detail of an embodiment of the shock absorber-tilt controller system.

Four shock absorber-tilt controller combinations are shown in cross-sectional detail in FIGS. 2A–2D. In all cases, the shock absorber-tilt control stabilizer 15, as shown in FIG. 3, is housed in casing 30. In FIG. 2A, a cylindrical metal or plastic tube 60 is attached to the inner wall of casing 30 at two or more locations by connectors 61, 62, 63 and 64. Tube 60 concentric with casing 30 is sized to permit fluid to flow from within the tube into the area 65 between the inner wall of casing 30 and the outer wall of the cylindrical tube 60. The piston 31 adapted to fit within the tube 60 is attached to the frame or body 11 of the vehicle.

Hydraulic fluid 38 is located within the inner wall 39 below the piston 31 and also in the area 65 between casing 30 and tube 60. A shock dampening unit 66 as shown in detail in FIGS. 9A and 9B may be placed within tube 60 and above a lockplate 32. When the vehicle hits a bump in the road, the piston 31 is moved downwardly to force fluid past the lockplate 32 through the opening 34. A seal 40 attached to a separate piston 33, does not close opening 34 since solenoid 36 is not activated when only a bump is encountered without substantial tilting of the vehicle. The hydraulic fluid 38 passes through the opening 34 and then up into the area 65 which acts as the "reservoir chamber".

As shown in FIG. 2A, the solenoid device 36 may be attached to the bottom of chamber 30. The solenoid has a spring assembly 37 to maintain the opening 34 in the open position below the lockplate 32. The solenoid's electrical wiring 41*a* and 41*b* communicates with the mercury switch of the sensing unit. While the seal 40 remains inactivated and if the opening 34 is quite large, there is little resistance to compression of the piston 31 or fluid flow through opening 34 when encountering a bump. To provide some dampening, a dampening unit 66 may be placed within the tube 60. The dampening unit 66 may comprise a series of springs and openings as shown in FIG. 9A or a series of plates having openings and pop-off valves as shown in FIG. 9B or may comprise a computer-operated motor acting on the piston 31 to decelerate its bump-induced movement.

Figure 9A:
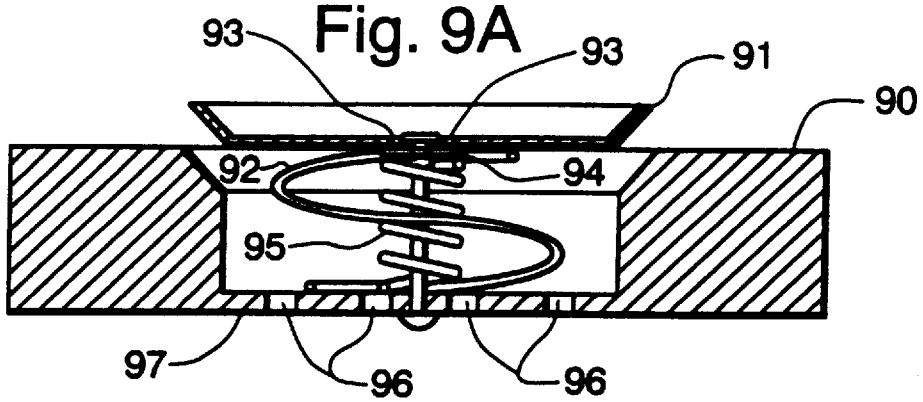
FIGS. 9A and 9B are vertical-sectional details of the shock-dampening means 66 shown in both FIGS. 2A and 2B.

The dampening unit shown in FIG. 9A is composed of a series of plates, valves and springs in a housing 90 affixed to the inner concentric tube 60 that operate to restrain the flow of fluid through opening 34 in FIG. 2A. Thus, when the shock is compressed, i.e., the distance between axle 11 and frame 17 is reduced, the piston 31 moves downwardly to force fluid downwardly. The fluid closes valve 91 by compressing a relatively weak spring 92. Valve 91 has openings or holes 93 surrounding its center which are blocked by plate 94. Plate 94 is held in place by a small diameter, but very strong spring 95. As pressure builds up based on the continued downward force of piston 31, spring 95 becomes compressed, the fluid flows through openings 93 and then through valved openings 96 in plate 97 and finally into the reservoir 65 between the inner wall of chamber 30 and the outer wall of tubular structure 60. When the shock extends, i.e., the axle 11 moves away from frame 17 of the vehicle, piston 31 moves upwardly; fluid is pulled from the outer chamber 65 to pass through openings 96 in plate 97 and through the open upper valve 91.

Figure 9B:
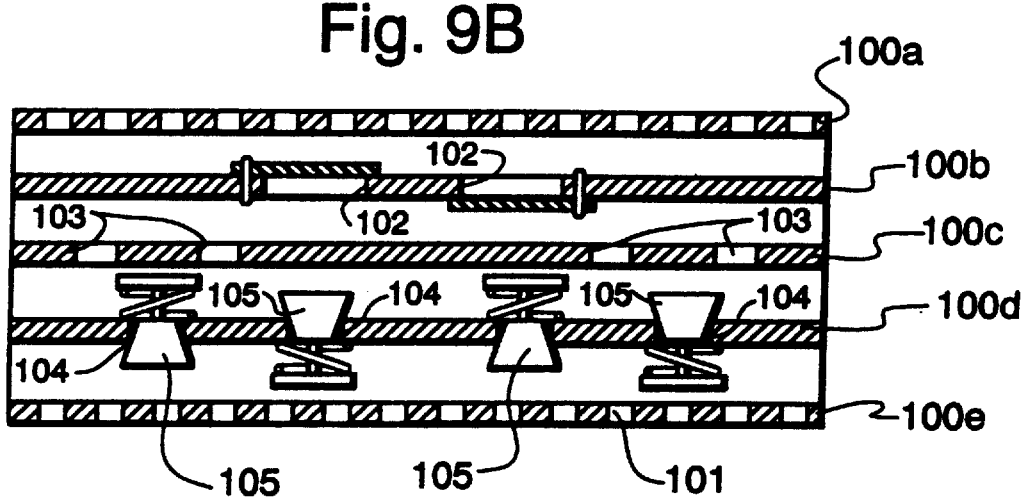

The dampening unit shown in FIG. 9B is composed of a series of five (5) plates 100*a–e* affixed to the inner wall of the tube as cylinder 60. The top and bottom plates 100*a* and 100*e* have a series of openings 101 arranged in substantially concentric circles. Plate 100*b* is shown with a centrally located "valved" opening(s) 102, which is pushed open by the downward force of the fluid in FIG. 2A. If the piston 31 is arranged to force fluid upwardly, as in FIG. 2B, then the "valve" or flexible plate would be placed above the opening (s) 102. Plate 100*c* is shown with a series of openings or holes 103, that are offset from the openings 101 and 102 arranged to provide additional resistance to fluid flow. Plate 100*d* is provided with a series of openings 104, each of which are provided with spring operated pop-off valves 105; some openings with valves adapted to resist downward flow and some adapted to resist upward flow.

Figure 2B:
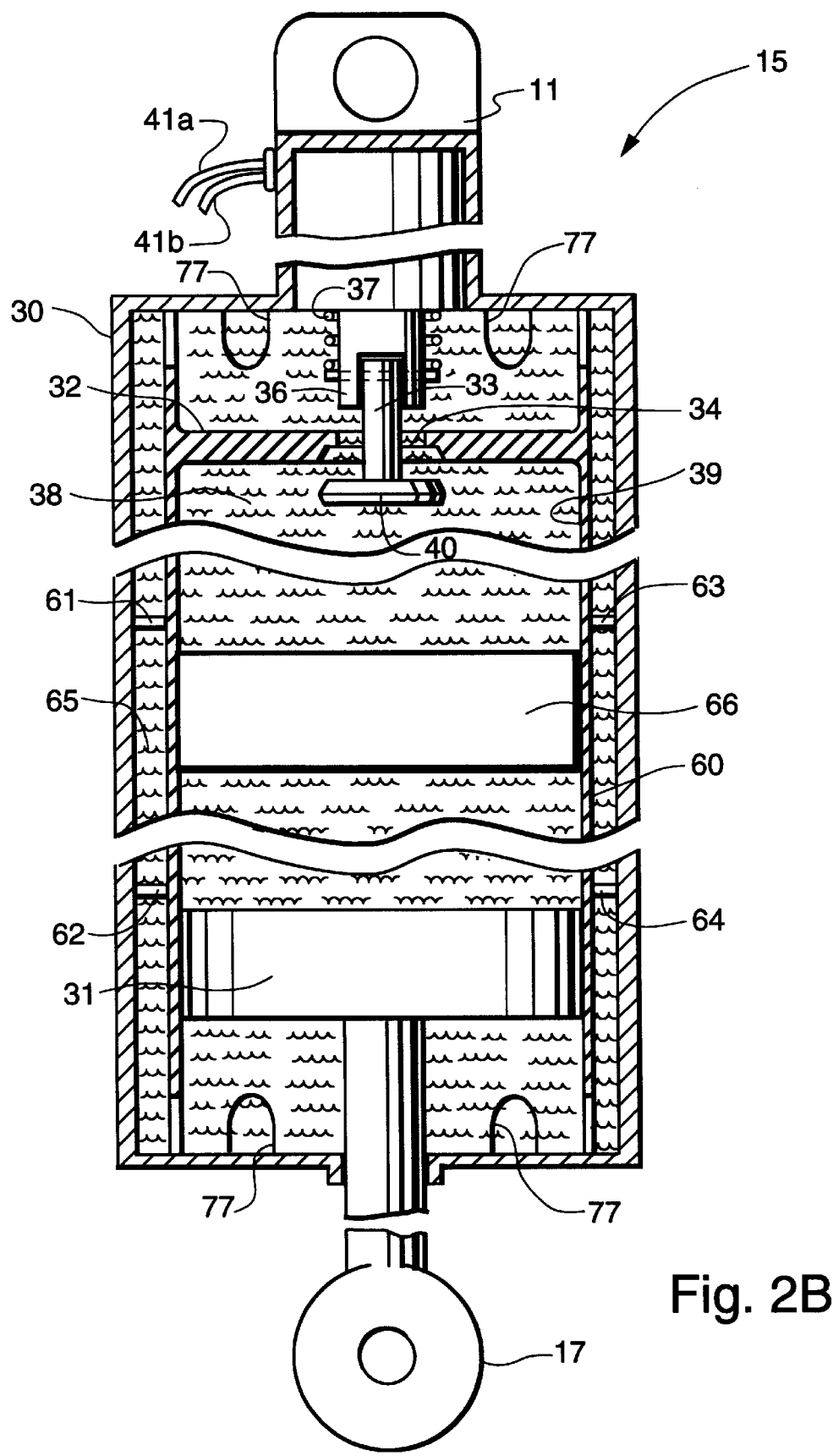
FIG. 2B is a vertical-sectional detail of another embodiment of a shock absorber-tilt controller system.

It should be understood that the above described shock dampening functions in FIGS. 9A and 9B are part of the described system in FIGS. 2A and 2B. When tilting or unusual lateral acceleration is encountered, the sensing unit 12 will activate the solenoid 36 and cause piston 33 to move downwardly activating the seal 40 to close the central opening 34 of the lockplate 32. No further fluid can flow from the chamber 39 up into the "reservoir chamber" 65. This prevents completely, any further movement of piston 31 and any accompanying downward movement of the body 11 or excessive tilting of the vehicle.

Alternatively, the system shown in FIG. 2A may be inverted to yield the system shown in FIG. 2B. It should be noted that the interior tubular structure 60 would be mounted within the chamber 39 so that opening(s) 77 would remain at the bottom as well as at the top of the chamber to permit fluid 38 to flow behind the piston 31. The piston 31 would be attached to the axle 17 while the chamber 39 would be attached to the body 11 of the vehicle. In all other respects, the operation would be similar to that shown for FIG. 2A.

To summarize, in normal operation the body of the vehicle 11 is moved up and down by the jarring action of the axle 17. The action, after being transmitted through the conventional shock absorber system as described above, is not sharp enough to upset the passengers within the vehicle nor sufficiently angular to activate the sensing unit of the tilt controller. However, as axle 17 is tilted more and more by the tilt in the road or by the lateral acceleration of the vehicle around a curve in the road dependent upon velocity and angle of turn, the body 11 forces the piston 31 deeper and deeper into the inner cylinder 60 with more and more fluid 38 flowing through opening 34 into overflow reservoir 65. As the body 11 approaches closer and closer to the axle 17 this tilt may ultimately shift the center of gravity of the vehicle, particularly in heavy trucks or vehicles carrying heavy loads, into an unstable position if not for the tilt sensing-controller system of this invention.

The tilt controller is electrically combined with the sensing device as shown in FIGS. 3A, 3B and 3C to prevent the shift of the center of gravity from becoming uncomfortable or, possibly, fatal. Basically, solenoid 36 in FIGS. 2A and 2B, is activated by the electrical circuit, which, in turn, was activated by the mercury switch, as shown in FIG. 4B, and serves to seal the opening 34 at a predetermined and preset maximum for the tilting of the vehicle. This closure prevents any further flow of fluid 38 into "reservoir" 65; and also prevents any further tilt of the vehicle. Basically, the piston 31, which is now unable to move, restrains any further tilt of the body of the vehicle almost instantaneously. This instantaneous action compares to the relatively slow action of the prior art tilt control systems that employ separate motors to activate pumps to resist the force of compression caused by tilting. Furthermore, the use of a substantially non-compressible hydraulic fluid compared to the air used in some prior art systems is also important for the success of the systems of this invention.

The solenoid device 36 is composed of a rod or piston 33 that fits within the solenoid 36. It is usually spring loaded and attached to the sealing means 40 as shown in FIG. 2A. The solenoid unit 36 is connected to the vehicle's electrical system through wires or other electrical connectors 41a and 41b, one to the vehicle's battery and the other to the sensing device 12, as shown in greater detail in FIGS. 3A, 3B and 3C.

Figure 2C:
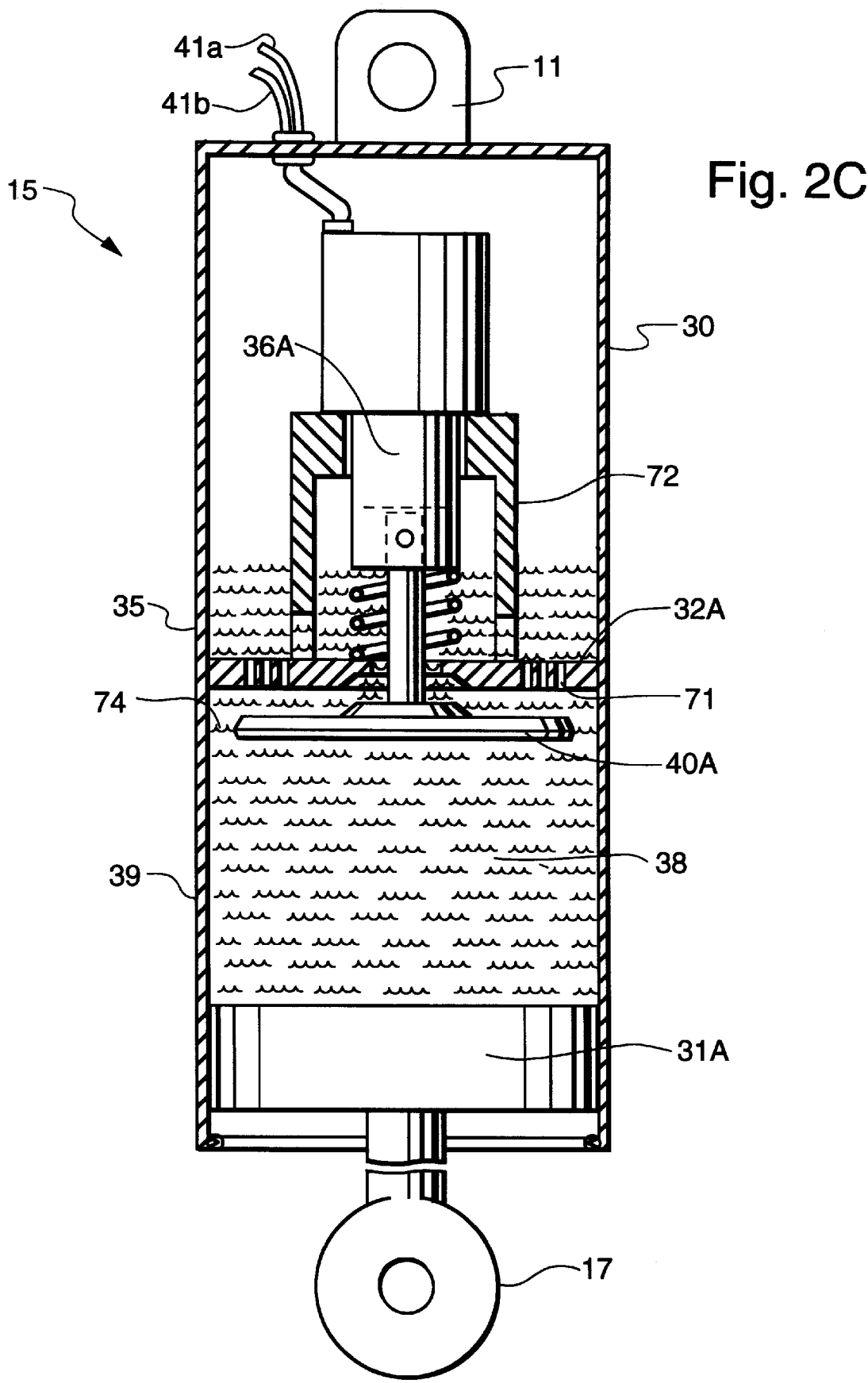
FIG. 2C is a vertical-sectional detail of another embodiment of the shock absorber-tilt controller system.
Figure 10:
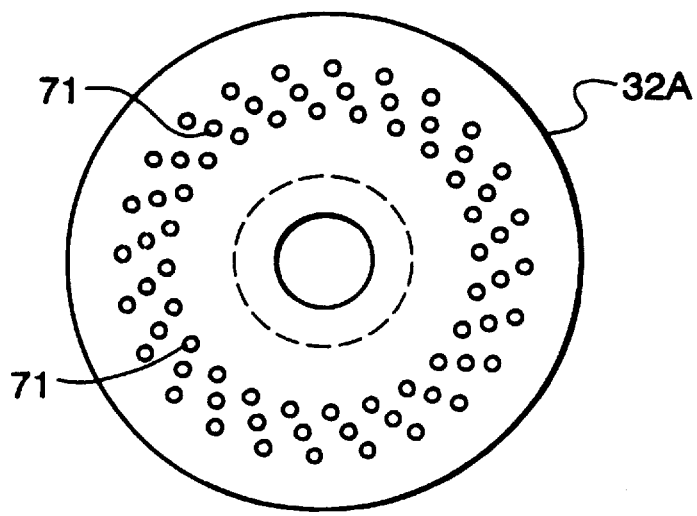
FIG. 10 is a top view of the lockplate used in the system shown in FIG. 2C.

Another alternative shock absorber-tilt controller system is shown in cross-sectional detail in FIG. 2C. In this system, casing 30 houses the system without any accompanying concentric cylinder within the casing. Instead, the plate 32A is composed of a series of openings 71 arranged in substantial circles around a central area of plate 32A with its "Swiss cheese" appearance is shown in FIG. 10. During conventional shock absorber action, any upward movement of piston 31 (connected to axle 17) is cushioned by the resisting fluid 38 within the casing 30. It should also be noted that the sealing plate 40A is concentric with casing 30 but leaves a sizable gap 74 around its periphery to allow fluid around the plate 40A during shock absorption.

However, when excessive tilting or unusual lateral acceleration is encountered, the sensing unit will activate solenoid 36A and cause the sealing plate 40A to cover all the openings 71 in the plate 32A. No fluid can then flow from the lower chamber 39 into the reservoir chamber 35 and the piston 31A can no longer move. By preventing any further movement of the piston 31A, further tilting of the body of the vehicle is also prevented.

Figure 2D:
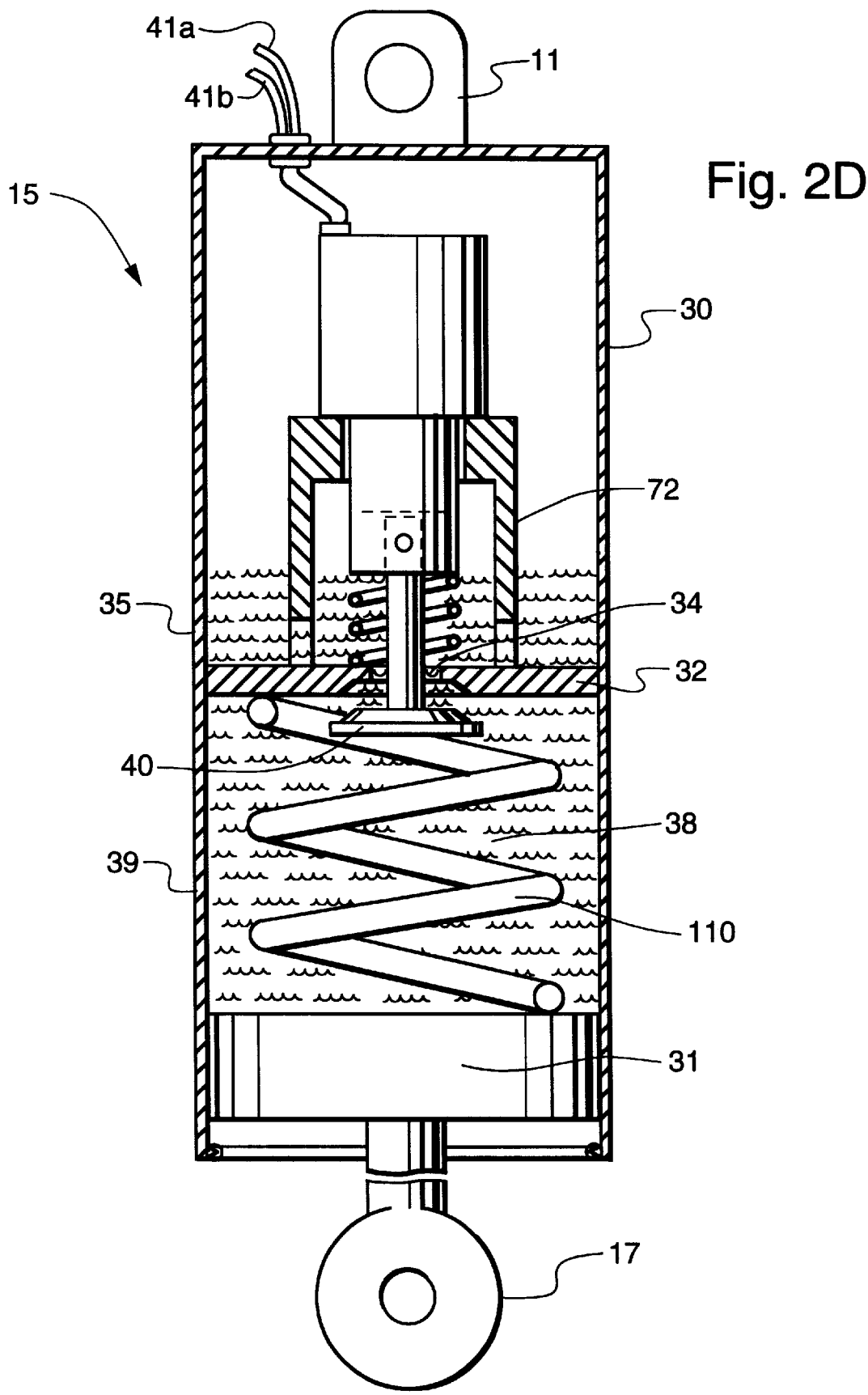
FIG. 2D is a vertical-sectional detail of still another embodiment of the shock absorber-tilt controller system.

In FIG. 2D is shown a shock absorber-tilt controller system similar to those shown in FIGS. 2 and 2C, i.e., without a concentric inner tubular structure and the piston arranged to force fluid upwardly. To provide dampening for the shock absorption function of the system, a mechanical spring 110 is affixed to the piston 31 and the plate 32 to further restrain movement of piston 31, thus, limiting the shock received by passengers in the vehicle.

The tilt controller function in FIG. 2D is accomplished substantially as in FIGS. 2 and 2C. The tilt sensing means sends its signal when excessive tilt is encountered; solenoid 36 is activated; sealing means 40 is drawn upwardly to seal the opening 34; flow of fluid and further movement of piston 31 ceases; and further tilt is prevented.

As shown in FIG. 3A, the sensing unit 12 is composed of a cylindrical tube 52, usually non-electrically conductive plastic, but may be metallic, e.g., copper, steel, aluminum, or the like, if the inner surface is coated with an insulating material. The tube 52 is mounted transversely and substantially parallel to axle 17 and attached, with bolts or other means, to the frame or body 11 of the vehicle. The tube 52 although substantially parallel to the axle is formed as a shallow "U" with an adjustment screw 51 at about the half-way point of its length to permit changes in the sensitivity of the sensing unit 12.

At each end of tube 52 are mercury switches, each of which contains a ball of mercury 53 within a glass envelope 54. Each switch is electrically connected to the respective solenoids 36 associated with the units 15 at each wheel and the vehicle's battery through conducting wires 41A and 41B.

In a desirable embodiment, means may be provided within the interior of the vehicle by which the driver is able to control the sensitivity of the sensing unit.

Specifically, as shown in FIG. 3A, the adjustment screw 51, or any other equivalent means movable up and down and adapted to control the curvature of the U-shaped tube 50, may be moved by motor 55. The action of motor 55 is, in turn, controlled by an interior switch, diagrammically shown at 56, which may be easily activated by the driver in anticipation of hazardous road conditions.

Figure 4A:
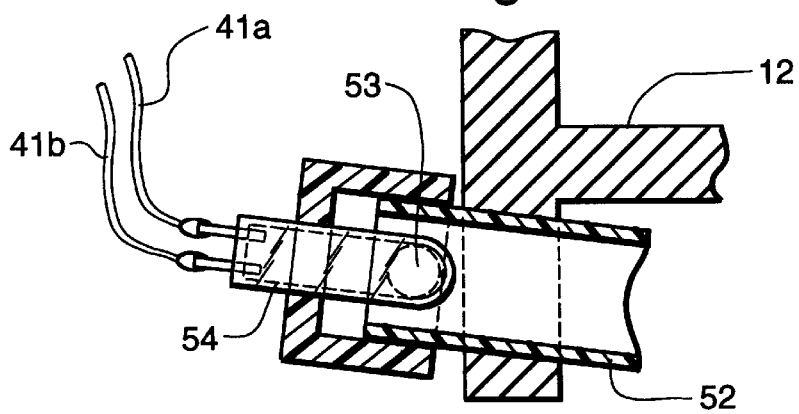
FIGS. 4A, 4B and 4C are enlarged detail sectional views of the mercury switch.
Figure 4B:
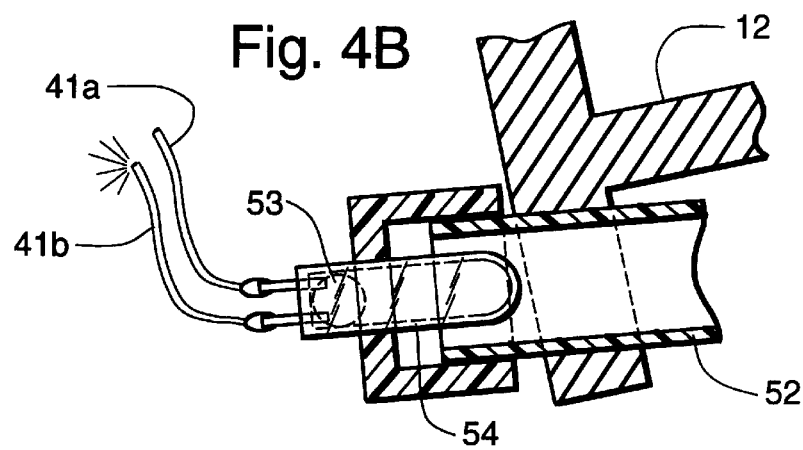

In any event, when the vehicle tilts sufficiently to the left, as shown in FIGS. 3A and 4A, the ball 53 in the switch on the left rolls to the left to complete the electrical circuit to the tilt controller or stabilizer 15 on the left side of the vehicle. Solenoid 36 is activated and the spring biased-valve shuts off flow of hydraulic fluid from the primary cylinder to the reservoir, and further vertical movement of the left side of the body 12 is prevented. When the vehicle returns to its normal position, the ball 53 rolls from its contact with wires 41a and 41b to its normal position. The hydraulic pressure combines with the expansion of the spring 37 (due to release of the compressive force from the solenoid) to permit the seal to pull away from lockplate and allowing fluid to again flow freely through the opening.

Figure 4C:
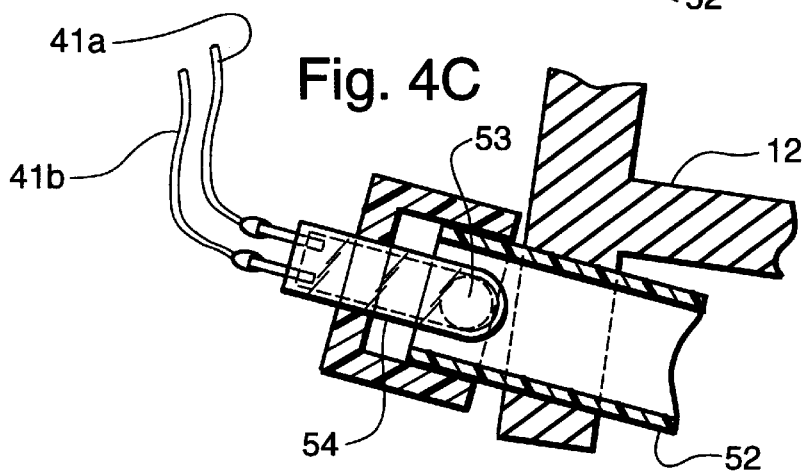

The foregoing series of operations occur for tilting of the vehicle to the right, as shown in FIGS. 3C and 4C. The electrical circuit is completed through the mercury switch positioned at the right, which activates the solenoid and closes the valve in the unit 15 on the right side of the vehicle.

Figure 1:
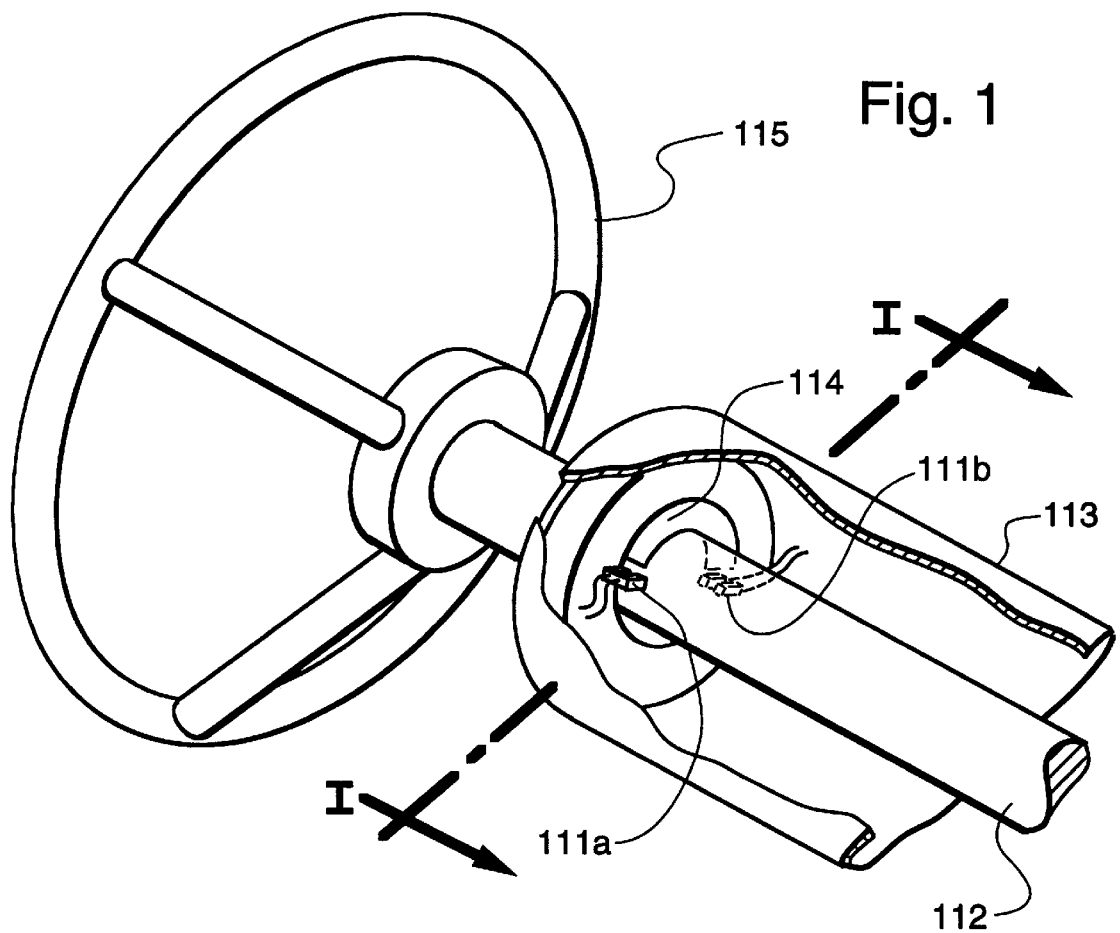
FIG. 1 is a view, in perspective, showing a steering wheel column equipped with a sensing unit for the tilt controller.
Figure 1A:
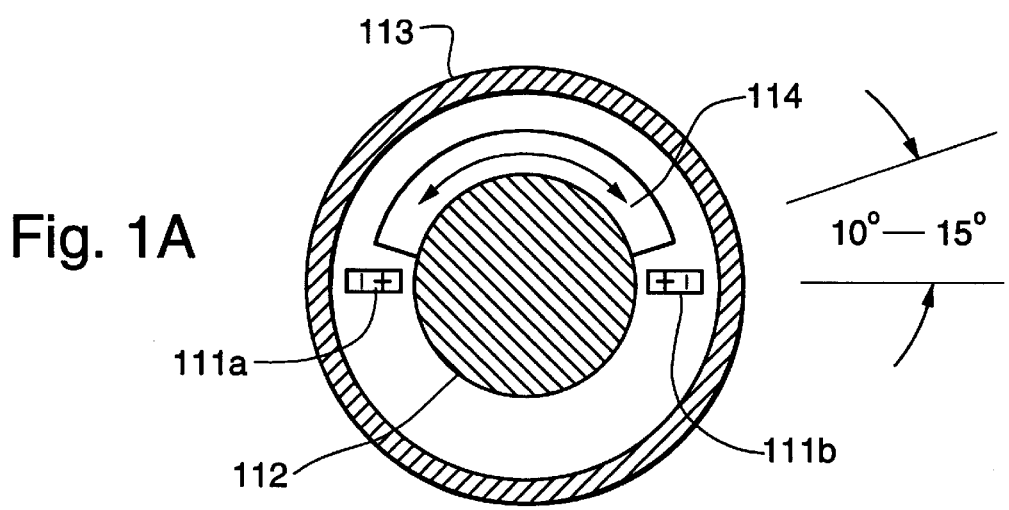
FIG. 1A is a cross-sectional view, along section A—A of FIG. 1, showing the important details of the sensing unit.

A preferred sensing-activator mechanism is shown in FIGS. 1 and 1A. Two copper protrusions 111a and 111b are located horizontally on the steering column housing 113. These protrusions are adapted to touch (and, therefore, connect electrically) to protrusion 114 located on the inside of steering column 112. Protrusion 114 is activated at an angle of 20 degrees and 160 degrees (or 10 degrees and 170 degrees, etc. from the horizontal). As the steering wheel 115 is turned to the right, the activator 114 rotates upward and touches the sensor 111a on housing 113 located at the 160 degree-position. This completes the electrical circuit to send a signal to the suspension systems, e.g., shock absorbers, on the left front and left rear axles to switch from the soft suspension to the stiff suspension.

As stated previously, this signal to activate the suspension system may also require a signal from the speed-measuring device, e.g., the vehicle's speedometer or RPM meter, at a pre-set value of 20 miles per hour or the corresponding RPM before the ultimate activation signal can reach the suspension system.

Figure 7:
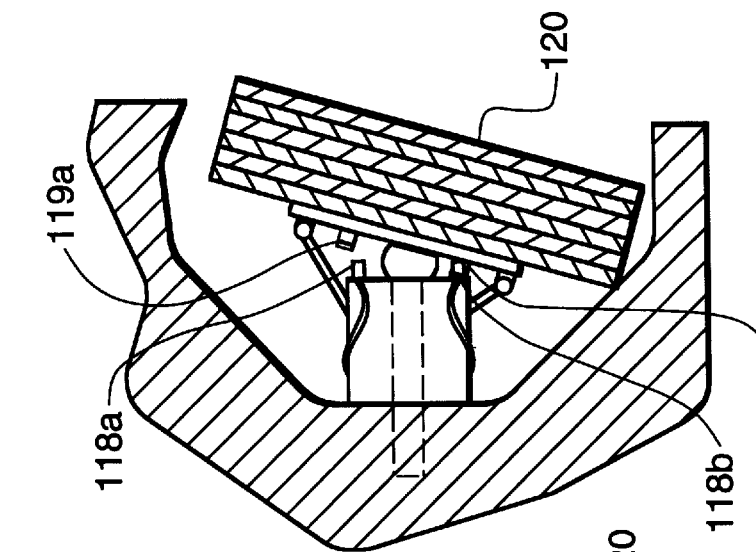
FIGS. 5, 6 and 7 are vertical-sectional partial views showing the operation of the wheel-turn sensing unit of the invention.
Figure 6:
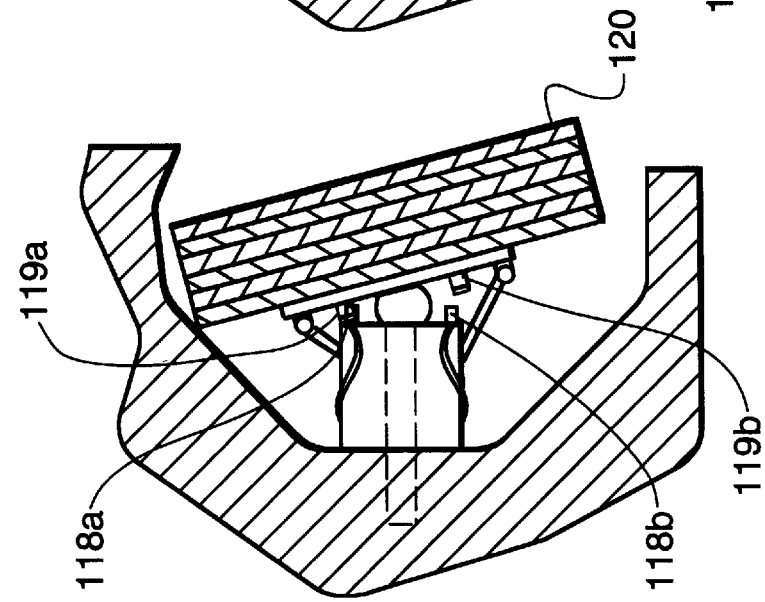
Figure 5:
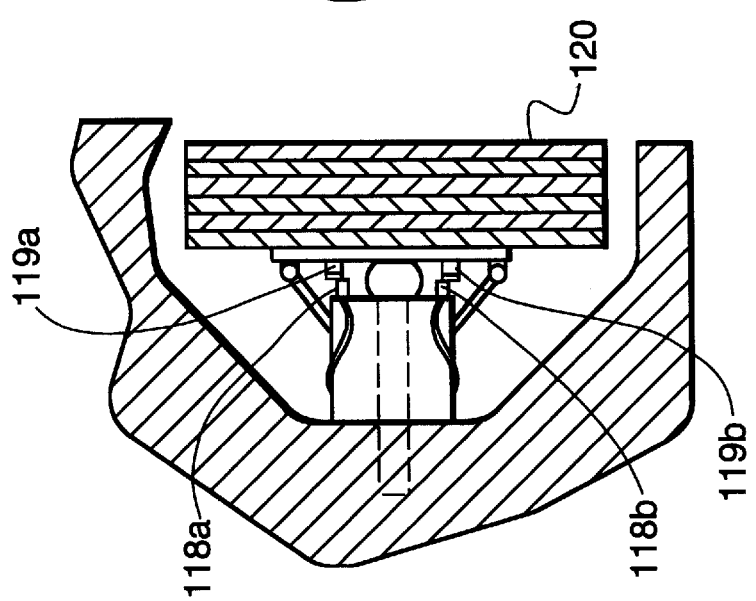

In FIGS. 5, 6 and 7, the operation of the wheel-turn sensing system is presented. FIG. 5 shows the neutral position with the vehicle moving in the forward direction, the suspension system being in its "soft" state. In this position, the wheel 116 is at an angle of 90 degrees to the axle 117. Sensors 118a and 118b are placed at the front and back of the axle (180 degrees apart, as viewed from above). Activators 119a and 119b are mounted on the wheel hub 120.

When a left turn is initiated as in FIG. 6 the left turn sensor 118a is activated by loss of contact with 119a. The turning angle at which loss of contact will occur is governed by the placement of sensor 118a relative to 119a which may be governed by the length of spring 121; or, if activation of the suspension system is to be controlled by contact between 118a and 119a, then the turning angle at which activation occurs may be controlled by the amount of compression imposed by a spring-loaded device, to which the sensor 118a or 118b is connected.

Figure 8:
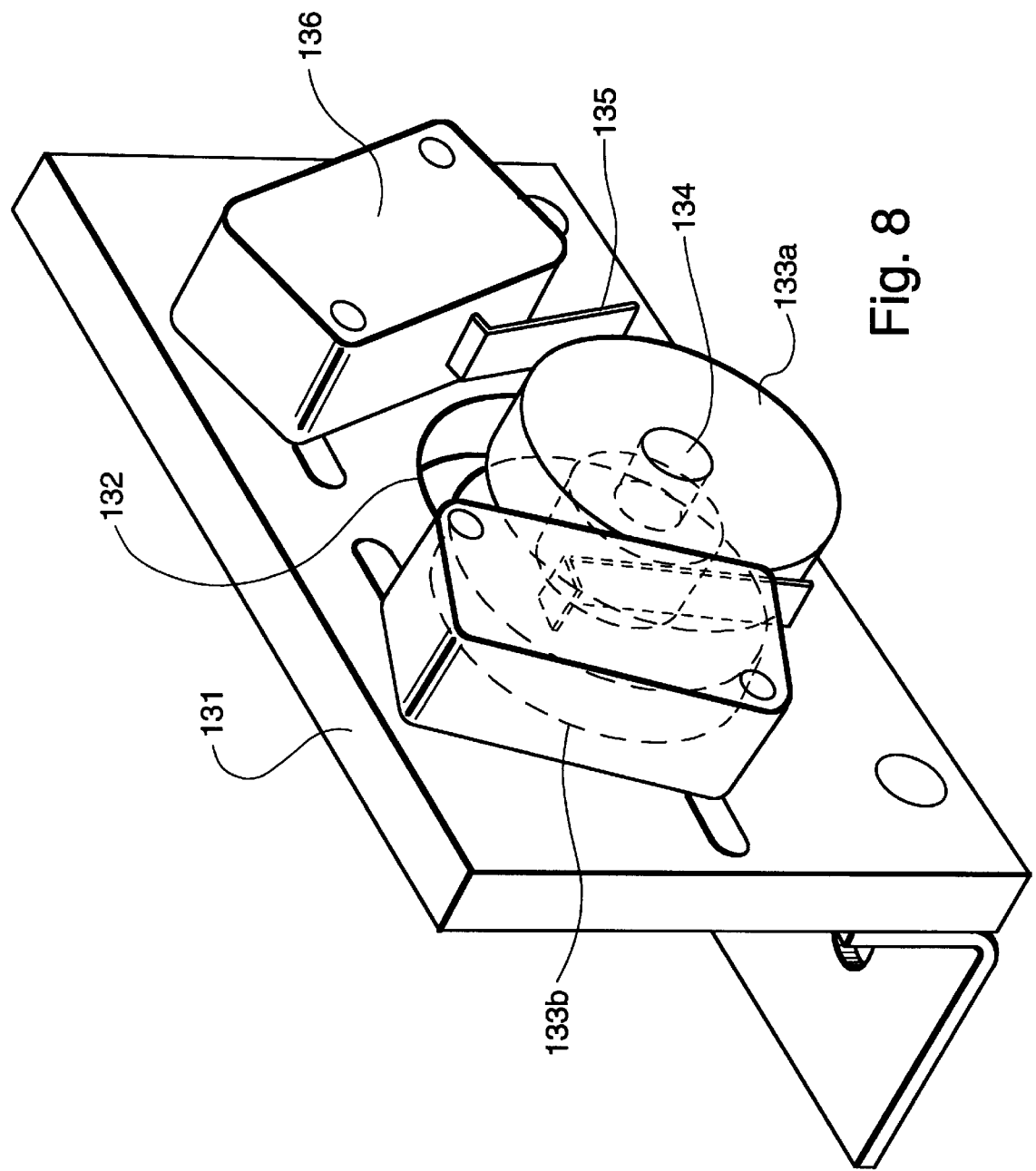
FIG. 8 is a view, in perspective, of the inertial activated sensing unit of the invention.

In the embodiment shown in FIG. 8, an inertial activator may be mounted cross-wise of the vehicle at a convenient location, e.g., the dashboard. The activator is composed of a vertical plate 131 with a curved (circular)opening 132. Within opening 132 is an assembly of two weights 133a and 133b connected by an axle 134 to maintain the weight in position on either side of the opening 132. As the vehicle turns to the left, the weight 133a will be carried by inertia to the right side of the device pushing copper plate 135 into block 136 to complete an electrical circuit which sends signal to the right side suspension or shock absorber to switch from "soft" to "stiff" as in the sensing device shown in FIG. 3.

I claim:

1. Apparatus for a vehicle having at least the following two structural elements, a transverse axle and a body comprising, on each side of the vehicle, a chamber partially filled with hydraulic fluid, a movable piston at one end of and within said chamber and attached to one of said structural elements; the other end of said chamber being attached to the other of said structural elements of the vehicle; a fixed plate within said chamber having a sealable opening to separate fluid within said chamber into two portions above and below said fixed plate; sealing means within said chamber adapted to seal said sealable opening; a steering wheel disposed between the two sides of the vehicle within a steering column rotatable through an angle from 0 to 180 degrees; sensing means within said steering column to sense rotation of said steering wheel and a pre-set minimum speed of said vehicle, such that when rotation of said steering wheel is below about 20 degrees or beyond about 160 degrees, at or above said pre-set minimum speed, said sensing means will send a signal to said sealing means; thereby, when activated by said sensing means, said sealing means will seal said sealable opening in said plate to prevent flow of said fluid from one portion to the other portion of said chamber, whereby tilting of one of said structural elements toward said other structural element is prevented.

2. Apparatus for a vehicle having at least the following two structural elements, a transverse axle and a body comprising, on each side of the vehicle, a chamber being partially filled with hydraulic fluid; a movable piston at one end of and within said chamber and attached to one of said structural elements; the other end of said chamber being attached to the other of said structural elements of the vehicle; a fixed plate within said chamber having a sealable opening to separate said fluid within the chamber into two portions above and below said fixed plate; sealing means within said chamber adapted to seal said sealable opening; wheels mounted at each end of said axle and sensing means placed at the front and back of said axle adapted to sense the turning of said wheels to the right and left and to sense a pre-set minimum speed of said vehicle; such that when said sensing means senses a turn below about 20 degrees or above about 160 degrees at or above said pre-set minimum speed; said sensing means will send a signal to said sealing means; thereby, when activated by said sensing means, said sealing means will seal said sealable opening in said separating means to prevent flow of said fluid from one portion to the other portion of said chamber, whereby tilting of one of said structural elements toward said other structural element is prevented.

3. Apparatus for a vehicle having at least the following two structural elements, a transverse axle and a body; a suspension system disposed between two said structural elements on each side of said vehicle; a steering wheel disposed between the two sides of said vehicle within a steering column rotatable through an angle of from 0 to 180 degrees; sensing means within said steering column to sense rotation of said steering wheel continuously at a pre-set minimum speed of said vehicle, such that when rotation of said steering wheel is beyond about 20 degrees or beyond about 160 degrees, at or above said pre-set minimum speed in accordance with the Table set forth below:

TABLE

| Vehicle Speed (miles/hour) | Turning Angle to Activate Suspension System Control (degrees) |
|---|---|
| 120 | 1 |
| 100 | 2 |
| 80 | 3 |
| 60 | 6 |
| 40 | 7–8 |
| 20 | 9–10 |
| 10 | 13–15 | said sensing means will send a signal to said suspension system whereby the rate of movement of said one structural element, said body, toward said other structural element, said axle, is reduced sufficiently to prevent further tilting of one of said structural elements toward said other structural element.

4. Apparatus for a vehicle having at least the following two structural elements, transverse axle and a body; a suspension system disposed between said two structural elements on each side of said vehicle; wheels mounted at each end of said axle and sensing means placed at the front and back of said axle adapted to sense continuously the turning of said wheels to the right and left at a pre-set minimum speed of said vehicle such that when said sensing means senses a turn below about 20 degrees or above about 160 degrees at or above said pre-set minimum speed in accordance with the Table set forth below:

TABLE

| Vehicle Speed (miles/hour) | Turning Angle to Activate Suspension System Control (degrees) |
|---|---|
| 120 | 1 |
| 100 | 2 |
| 80 | 3 |
| 60 | 6 |
| 40 | 7–8 |
| 20 | 9–10 |
| 10 | 13–15 | said sensing means will send a signal to said suspension system whereby the rate of movement of said one structural element, said body, toward said other structural element, said axle, is reduced sufficiently to prevent further tilting of one of said structural elements toward said other structural element.

5. A vehicle having a suspension system disposed between a transverse axle and a body of said vehicle wherein the vehicle is equipped with means for controlling the suspension system, the improvement comprises means for continuously sensing angular or steering movement of said vehicle and means for activating said means for controlling said suspension system at a pre-set angle of movement of said vehicle depending upon the speed of the vehicle in accordance with the Table set forth below:

TABLE

| Vehicle Speed (miles/hour) | Turning Angle to Activate Suspension System Control (degrees) |
|---|---|
| 120 | 1 |
| 100 | 2 |
| 80 | 3 |
| 60 | 6 |
| 40 | 7–8 |
| 20 | 9–10 |
| 10 | 13–15 | to convert the normally fast rate of movement of the body toward said axle to a slower rate of movement of said body toward said axle.

* * * * *

US005979616C1

(12) EX PARTE REEXAMINATION CERTIFICATE (10024th)

United States Patent
Smith

(10) Number: US 5,979,616 C1
(45) Certificate Issued: Feb. 10, 2014

(54) TILT CONTROL APPARATUS FOR VEHICLES

(75) Inventor: Stewart Gregory Smith, Yorklyn, DE (US)

(73) Assignee: Cloud Farm Associates L.P., Yorklyn, DE (US)

Reexamination Request:
No. 90/012,733, Dec. 5, 2012

Reexamination Certificate for:
Patent No.: 5,979,616
Issued: Nov. 9, 1999
Appl. No.: 09/020,063
Filed: Feb. 6, 1998

Related U.S. Application Data

(63) Continuation-in-part of application No. 08/603,164, filed on Feb. 20, 1996, now abandoned, which is a continuation-in-part of application No. 08/508,613, filed on Jul. 28, 1995, now Pat. No. 5,529,153, which is a continuation-in-part of application No. 08/195,903, filed on Feb. 10, 1994, now Pat. No. 5,437,354, which is a continuation of application No. 08/089,238, filed on Jul. 12, 1993, now abandoned.

(51) Int. Cl.
*F16F 9/46* (2006.01)

(52) U.S. Cl.
USPC ............... 188/266.1; 188/322.13; 70/41

(58) Field of Classification Search
USPC ......... 188/266.1, 299.1, 322.13, 322.14, 315; 701/41; 180/274; 267/221, 226; 280/124.104, 124.106, 124.112, 777
See application file for complete search history.

(56) References Cited

To view the complete listing of prior art documents cited during the proceeding for Reexamination Control Number 90/012,733, please refer to the USPTO's public Patent Application Information Retrieval (PAIR) system under the Display References tab.

*Primary Examiner* — Matthew C. Graham

(57) ABSTRACT

A device for sensing the angular or turning movement of a moving vehicle is disclosed. At a pre-set point in the turn, the sensing device will provide a signal to the suspension system to change from "soft" to "stiff" suspension and thus prevent any further tilting of the vehicle.

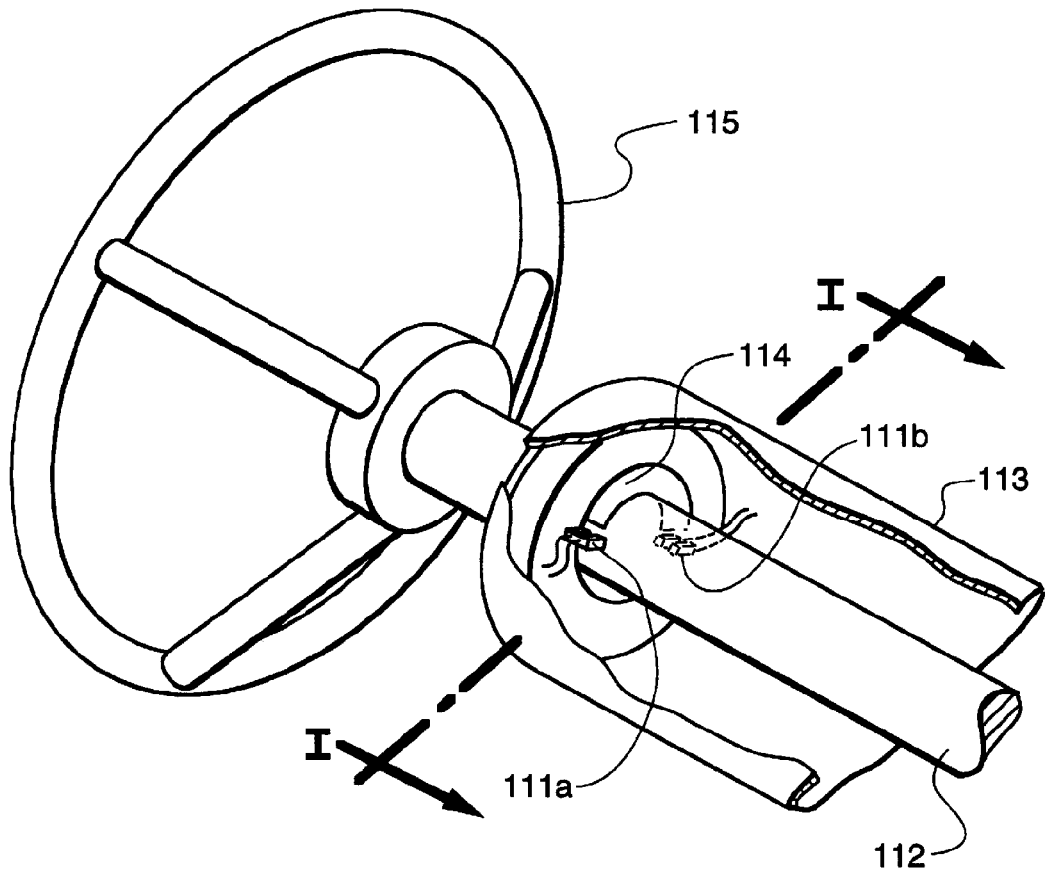

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 3 and 5 is confirmed.

Claims 2 and 4 were not reexamined.

\* \* \* \* \*

US005979616C2

(12) EX PARTE REEXAMINATION CERTIFICATE (10427th)
United States Patent
Smith

(10) Number: US 5,979,616 C2
(45) Certificate Issued: Dec. 5, 2014

(54) TILT CONTROL APPARATUS FOR VEHICLES

(75) Inventor: Stewart Gregory Smith, Yorklyn, DE (US)

(73) Assignee: Cloud Farm Associates L.P., Yorklyn, DE (US)

Reexamination Request:
No. 90/013,159, Feb. 21, 2014

Reexamination Certificate for:
Patent No.: 5,979,616
Issued: Nov. 9, 1999
Appl. No.: 09/020,063
Filed: Feb. 6, 1998

Reexamination Certificate C1 5,979,616 issued Feb. 10, 2014

Related U.S. Application Data

(63) Continuation-in-part of application No. 08/603,164, filed on Feb. 20, 1996, now abandoned, which is a continuation-in-part of application No. 08/508,613, filed on Jul. 28, 1995, now Pat. No. 5,529,153, which is a continuation-in-part of application No. 08/195,903, filed on Feb. 10, 1994, now Pat. No. 5,437,354, which is a continuation of application No. 08/089,238, filed on Jul. 12, 1993, now abandoned.

(51) Int. Cl.
*F16F 9/46* (2006.01)

(52) U.S. Cl.
USPC .................. 188/266.1; 701/41; 188/322.13

(58) Field of Classification Search
None
See application file for complete search history.

(56) References Cited

To view the complete listing of prior art documents cited during the proceeding for Reexamination Control Number 90/013,159, please refer to the USPTO's public Patent Application Information Retrieval (PAIR) system under the Display References tab.

*Primary Examiner* — William Doerrler

(57) ABSTRACT

A device for sensing the angular or turning movement of a moving vehicle is disclosed. At a pre-set point in the turn, the sensing device will provide a signal to the suspension system to change from "soft" to "stiff" suspension and thus prevent any further tilting of the vehicle.

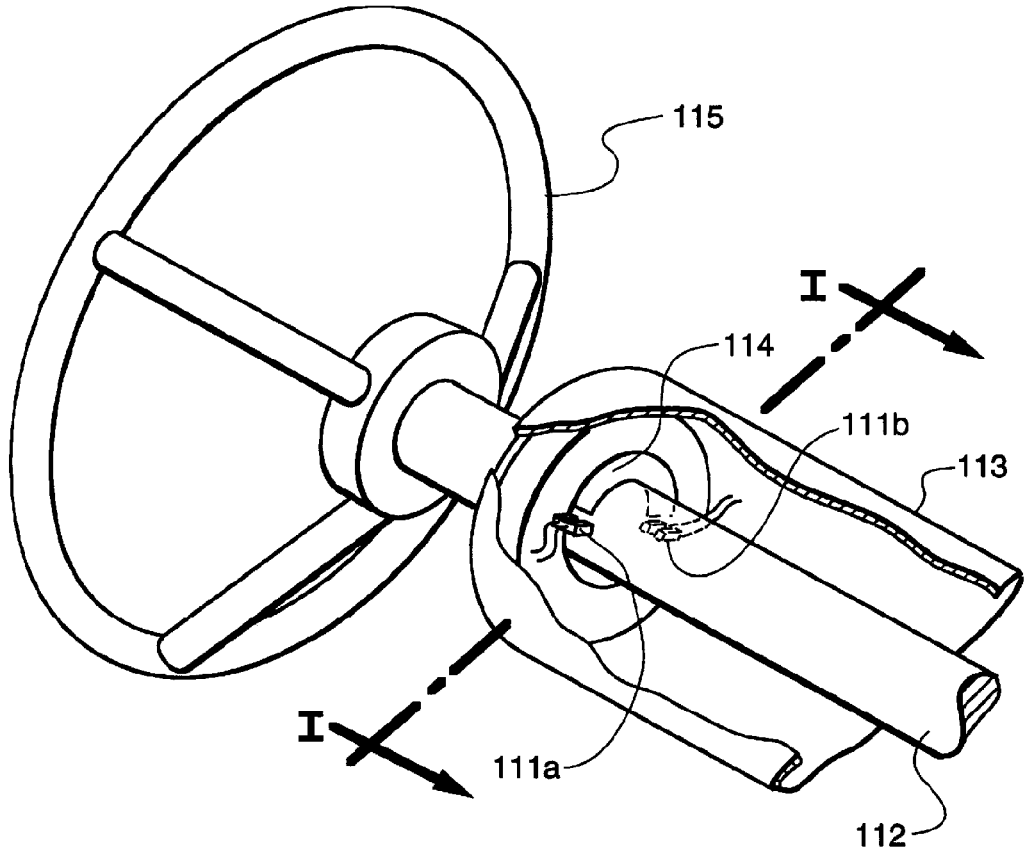

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 3 and 5 is confirmed.

Claims 2 and 4 were not reexamined.

* * * * *